United States Patent
Moon et al.

(10) Patent No.: US 10,193,455 B2
(45) Date of Patent: Jan. 29, 2019

(54) RESONANT CAPACITOR STABILIZER IN RESONANT CONVERTERS

(71) Applicant: FAIRCHILD KOREA SEMICONDUCTOR LTD., Buehcon (KR)

(72) Inventors: Sangcheol Moon, Bucheon (KR); Jintae Kim, Sungnam-si (KR); Hangseok Choi, Suwon (KR)

(73) Assignee: Semiconductor Components Industries, LLC, Phoenix, AZ (US)

( * ) Notice: Subject to any disclaimer, the term of this patent is extended or adjusted under 35 U.S.C. 154(b) by 0 days.

(21) Appl. No.: 15/668,975

(22) Filed: Aug. 4, 2017

(65) Prior Publication Data
US 2018/0054133 A1    Feb. 22, 2018

Related U.S. Application Data

(60) Provisional application No. 62/377,063, filed on Aug. 19, 2016.

(51) Int. Cl.
| | |
|---|---|
| *H02M 3/335* | (2006.01) |
| *H02M 1/36* | (2007.01) |
| *H02M 1/32* | (2007.01) |
| *H02M 3/337* | (2006.01) |
| *H02M 1/00* | (2006.01) |

(52) U.S. Cl.
CPC ......... *H02M 3/33515* (2013.01); *H02M 1/32* (2013.01); *H02M 1/36* (2013.01); *H02M 3/3376* (2013.01); *H02M 3/33523* (2013.01); *H02M 2001/0009* (2013.01); *H02M 2001/0035* (2013.01); *H02M 2001/0054* (2013.01)

(58) Field of Classification Search
CPC ......... H02M 3/33515; H02M 3/33523; H02M 3/3353; H02M 2007/4815; H02M 2007/4818; H02M 1/36; H02M 2001/0009; H02M 1/32
See application file for complete search history.

(56) References Cited

U.S. PATENT DOCUMENTS

| | | | |
|---|---|---|---|
| 5,973,943 | A | 10/1999 | Ribarich et al. |
| 6,256,210 | B1 | 7/2001 | Strijker et al. |
| 6,331,755 | B1 | 12/2001 | Ribarich et al. |

(Continued)

OTHER PUBLICATIONS

Keeping, Steven, Digi-Key Electronics, "A Review of Zero-Voltage Switching and Its Importance to Voltage Regulation," May 7, 2017.

(Continued)

*Primary Examiner* — Kyle J Moody
(74) *Attorney, Agent, or Firm* — Brake Hughes Bellermann LLP (57) ABSTRACT

According to an implementation, a resonant converter for resonant capacitance stabilization during start-up includes an oscillator configured to generate a first clock signal to drive a first driver for a first power switch, and a second clock signal to drive a second driver for a second power switch during switching operations, and a resonant capacitor stabilizer configured to control the second driver to periodically activate the second power switch to discharge a resonant capacitor of a resonant network during initialization of the switching operations of the resonant converter.

19 Claims, 7 Drawing Sheets

(56) References Cited

U.S. PATENT DOCUMENTS

| | | | |
|---|---|---|---|
| 6,496,387 B2 | 12/2002 | Halberstadt | |
| 6,879,115 B2 | 4/2005 | Ribarich | |
| 7,116,561 B2* | 10/2006 | Osaka | H02M 3/33523 363/21.02 |
| 7,323,825 B2 | 1/2008 | Hwang et al. | |
| 7,750,615 B2 | 7/2010 | Jung et al. | |
| 8,014,176 B2 | 9/2011 | Melanson et al. | |
| 8,737,101 B2 | 5/2014 | Cho et al. | |
| 9,203,318 B2 | 12/2015 | Scibilia | |
| 2009/0244934 A1 | 10/2009 | Wang et al. | |
| 2010/0202170 A1 | 8/2010 | Kim et al. | |
| 2012/0307530 A1 | 12/2012 | Miyazaki | |
| 2015/0003117 A1 | 1/2015 | Ferrazza et al. | |
| 2015/0229220 A1* | 8/2015 | Lee | H02M 1/32 363/21.03 |
| 2018/0054134 A1* | 2/2018 | Moon | H02M 1/08 |

OTHER PUBLICATIONS

Abdel-Rahman, Sam, Infineon Technologies North America (IFNA) Corp., "Resonant LLC Converter: Operation and Design," V1.0 Sep. 2012.

STMicroelectronics, "AN2644 Application Note, An Introduction to LLC Resonant Half-Bridge Converter," Sep. 2008.

STMicroelectronics, "L6699 Enhanced High Voltage Resonant Controller," Jan. 2013.

Fairchild Semiconductor, now part of ON Semiconductor, "FAN7631 Advanced Pulse Frequency Modulation (PFM) Controller for Half-Bridge Resonant Converters," Apr. 2012.

STMicroelectronics, "L6699 Enhanced High-Voltage Resonant Controller," 2017.

ON Semiconductor, "NCP1399: Current Mode Resonant Controller with Integrated High Voltate Drivers, High Performance," My 21, 2017.

ON Semiconductor, "NPC1399 Series High Performance Current Mode Resonant Controller with Integrated High-Voltage Drivers," Jan. 2017.

Fairchild Semiconductor, now part of ON Semiconductor, "AN-6104 LLC Resonant Converter Design Using FAN7688," Sep. 16, 2015.

STMicroelectronics, "STCMB1 TM PFC with X-Cap Discharge and LLC Resonant Combo Controller," 2017.

Shenzhen Ming Feng Wei Electronics Co., Ltd., "Supply TEA1916T NXP NXP Synchronous Rectifier Controller," May 7, 2017.

* cited by examiner

RESONANT CAPACITOR STABILIZER IN RESONANT CONVERTERS

RELATED APPLICATIONS

This application claims priority to and the benefit of, under 35 U.S.C. § 119, U.S. Provisional Patent Application No. 62/377,063, filed Aug. 19, 2016, which is hereby incorporated by reference in its entirety.

This application is related to U.S. patent application Ser. No. 15/668,974, filed on Aug. 4, 2017, U.S. patent application Ser. No. 15/668,980, filed on Aug. 4, 2017, and U.S. patent application Ser. No. 15/668,983, filed on Aug. 4, 2017, each of which is incorporated by reference in its entirety.

TECHNICAL FIELD

This description relates to improving operations of resonant converters.

BACKGROUND

Resonant converters may convert an input voltage to an output voltage. At start-up, the voltage of a resonant capacitor may be unpredictable. For example, during resonant converter switching operations, the voltage of the resonant capacitor may vary between a low voltage level and a high voltage level. If the resonant capacitor stops operating (e.g., power-off or trigging of a protection mechanism), the switching operation of a bridge circuit may be disabled. At this moment, the value of the voltage of the resonant capacitor may be unknown causing it to be unpredictable as subsequent start-up.

SUMMARY

According to an implementation, a resonant converter for resonant capacitance stabilization during start-up includes an oscillator configured to generate a first clock signal to drive a first driver for a first power switch, and a second clock signal to drive a second driver for a second power switch during switching operations, and a resonant capacitor stabilizer configured to control the second driver to periodically activate the second power switch to discharge a resonant capacitor of a resonant network during initialization of the switching operations of the resonant converter.

The details of one or more implementations are set forth in the accompanying drawings and the description below. Other features will be apparent from the description and drawings, and from the claims.

DETAILED DESCRIPTION

A resonant converter can be configured, during start-up, to provide resonant capacitance stabilization. The resonant converter can include an oscillator and a resonant capacitor stabilizer. The oscillator can be configured to drive multiple switches, and the resonant capacitor stabilizer can be configured to periodically activate at least one of the power switches to discharge a resonant capacitor of a resonant network during initialization of the switching operations of the resonant converter. The resonant capacitor stabilizer may reduce the amount of current spike through one of the power switches.

Figure 1A:
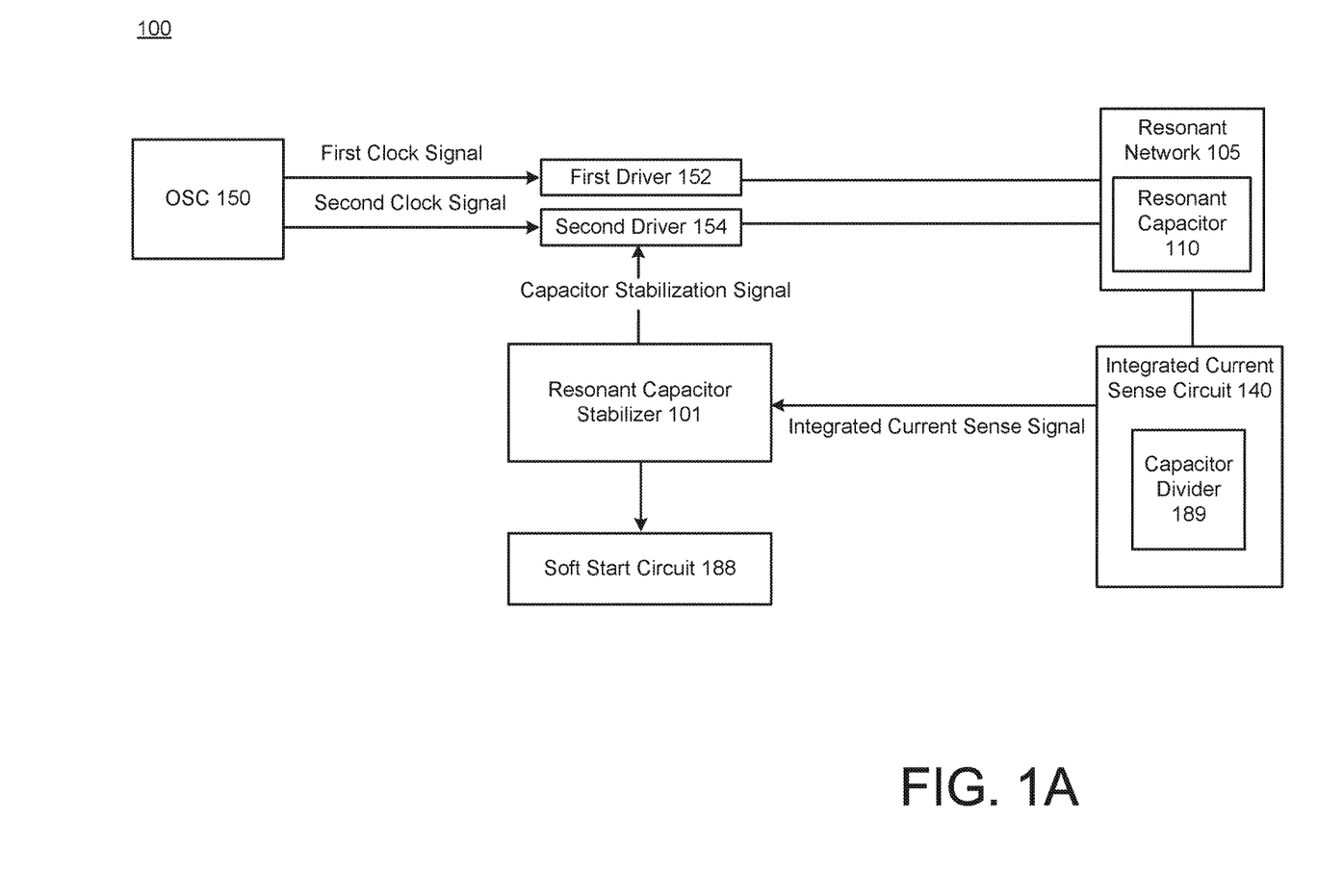
FIG. 1A illustrates a resonant converter for resonant capacitance stabilization during start-up according an implementation.

FIG. 1A illustrates a resonant converter 100 for resonant capacitance stabilization during start-up according an implementation. In some examples, the resonant converter 100 may be an electric power converter that includes a network of one or more inductors and one or more capacitors, which are tuned to resonate at one or more frequencies, and convert an input voltage to an output voltage based on resonant current oscillation.

The resonant converter 100 includes an oscillator 150 configured to generate a first clock signal to drive a first driver 152 for a first power switch, and a second clock signal to drive a second driver 154 for a second power switch during switching operations. The resonant converter 100 includes a resonant capacitor stabilizer 101 configured to control the second driver 154 to periodically activate the second power switch (at different instances) to discharge a resonant capacitor 110 of a resonant network 105 during initialization of the switching operations of the resonant converter 100.

In some examples, with respect to a first activation instance (also can be referred to as a time or time period), the resonant capacitor stabilizer 101 is configured to send a capacitor stabilization signal to the second driver 154 to turn-on the second power switch to discharge the resonant capacitor 110 in response to a start of the initialization of the switching operations of the resonant converter 100. With respect to the first activation instance, the second power switch may be activated until a voltage of an integrated current sense signal is equal to or below a voltage threshold. In some examples, the resonant capacitor stabilizer 101 may receive the integrated current sense signal sensed on a primary side of a transformer of the resonant network 105.

For example, the resonant converter 100 may include an integrated current sense circuit 140 connected to the resonant capacitor 110. The integrated current sense circuit 140 is configured to sense the integrated current sense signal on the primary side of the transformer of the resonant network 105. In some examples, the integrated current sense circuit 140 is configured to sense the integrated current sense signal using a capacitor divider 189. In response to the voltage of the integrated current sense signal being equal to or below the voltage threshold, the second power switch transitions to a deactivated state. The second power switch may have a first duration in which in the second power switch is activated during the first activation instance (e.g., from the time the first power switch is activated until the second power switch is deactivated).

In some implementations, after a predetermined time has elapsed after the deactivation of the second power switch, the resonant capacitor stabilizer 101 may re-activate the second power switch at a second activation instance by sending the capacitor stabilization signal to the second driver 154 to turn-on the second power switch again to discharge the resonant capacitor 110, and the second power switch remains activated until the voltage of the integrated current sense signal is equal to or below the voltage threshold. The second power switch may have a second duration in which in the second power switch is activated during the second activation instance. The second power switch may be deactivated during the period of time between the first duration and the second duration. Also, the first duration may be separated from the second duration at a predetermined interval of time (which may be same or different between other activation instances).

The resonant capacitor stabilizer 101 may continue to periodically activate the second power switch (e.g., at a third activation instance, a fourth activation instance, and so forth) until the resonant capacitor 110 is fully (or substantially) discharged. For example, at each activation instance, the resonant capacitor stabilizer 101 may discharge the resonant capacitor 110 (a portion at a time) until the resonant capacitor 110 is fully (or substantially) discharged. In addition, the activation time of the second power switch increases over time as the resonant capacitor stabilizer 101 periodically activates the second power switch. For example, when the second activation instance occurs after the first activation instance, the second duration (at the second activation instance) may be longer than the first duration (at the first activation instance).

After the resonant capacitor 110 is discharged (or after the end of the capacitor stabilization period), the resonant capacitor stabilizer 101 is configured to trigger a soft start circuit 188 to start soft start operations. In some examples, the resonant capacitor stabilizer 101 is configured to compare an activation time of the second power switch at each activation instance to a threshold, and, in response to the activation time (e.g., the length of the second duration) being greater than the threshold time, the resonant capacitor stabilizer 101 may determine that the resonant capacitor 110 is discharged, and then trigger the soft start circuit 188 to start soft start operations. During soft start operations, the soft start circuit 188 may control the oscillation 150 to alternatively generate the first clock signal and the second clock signal and gradually increase a duty cycle and gradually decrease the switching frequency of the first and second clock signals. However, by performing the operations of the resonant capacitor stabilizer 101 before the soft start operations, current spikes that otherwise might occur on the primary side of the transformer of the resonant network 105 may be reduced.

Resonant converters having the resonant capacitor stabilizer 101 can be advantageous over existing solutions because the resonant capacitor stabilizer 101 may reduce the amount of current spike through the second power switch by discharging the resonant capacitor 110 several times in a gradual manner. In some examples, before activating the first power switch, the existing solutions may activate the second power switch for a relatively long period of time, which can generate a relatively large amount of current through the second power switch. In addition, since the resonant capacitor stabilizer 101 compares the voltage of the integrated current sense signal to a voltage threshold (and de-activates the resonant capacitor 110 discharge when the voltage is below the voltage threshold), the amount of negative current flowing through the second power switch can be reduced.

For example, if there is no resonant capacitance discharge before the soft start operation, and the voltage of the resonant capacitor 110 is relatively high, a relatively large amount of negative current may flow through the second power switch. However, the resonant capacitor stabilizer 101 may discharge the resonant capacitor 110 to a relatively low level (e.g., 0V), and the subsequent generation of a short first clock signal and a longer second clock signal may reduce the current spike through the second power switch, as further shown in, for example, FIG. 7.

Figure 1B:
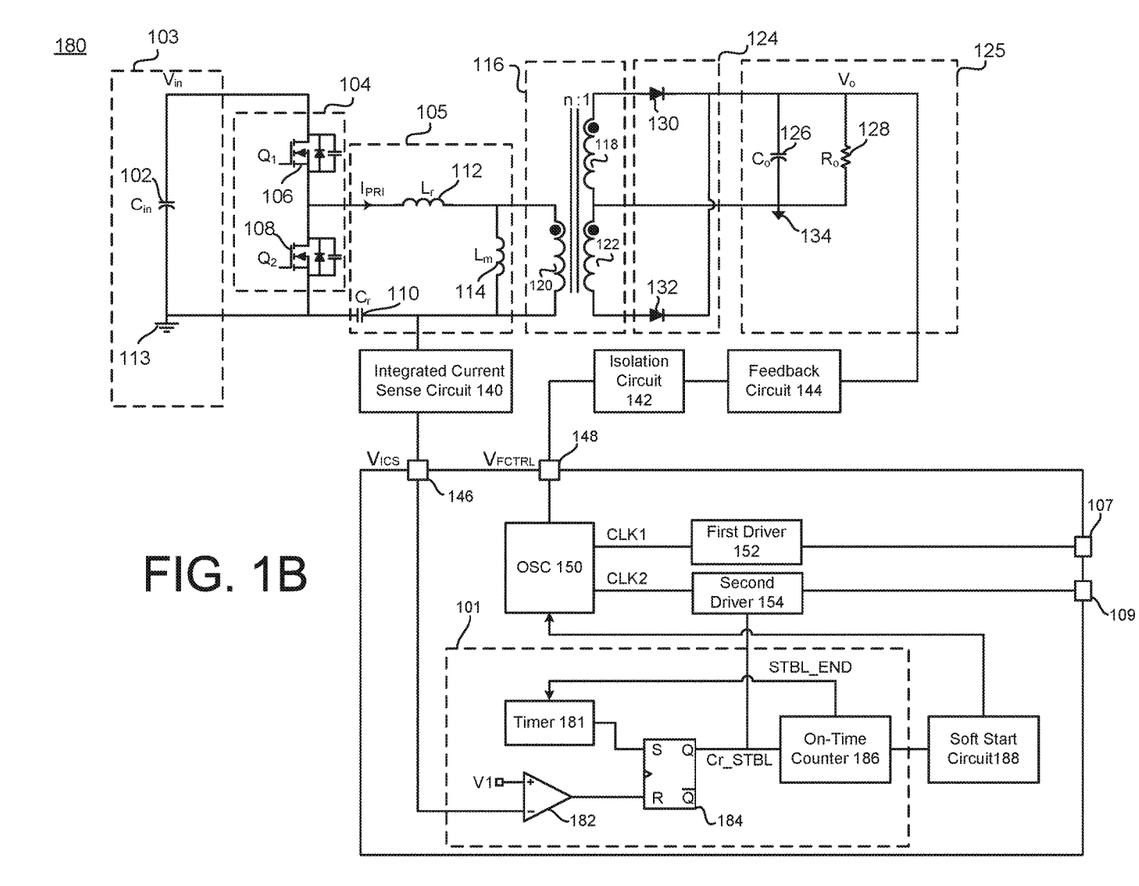
FIG. 1B illustrates a resonant converter for resonant capacitance stabilization during start-up according another implementation.

FIG. 1B illustrates a resonant converter 180 for resonant capacitance stabilization during start-up according to another implementation. In some examples, the resonant converter 180 may be an electric power converter that includes a network of one or more inductors and one or more capacitors, which are tuned to resonate at one or more frequencies, and convert an input voltage ($V_{in}$) to an output voltage ($V_o$) based on resonant current oscillation. In some examples, the resonant converter 180 may be a direct current (DC) to DC converter. In some examples, the resonant converter 180 may be a Zero Voltage Switching (ZVS) resonant converter, which turns on at zero voltage, and the output voltage can be controlled by varying the frequency of the switching. In some examples, the resonant converter 180 can be used in a variety of different applications such as Advanced Technology eXtended (ATX) power, server power, audio systems, lighting, game console, computing devices, low to high power applications, and/or soft switching to high frequency switching.

In some examples, the resonant converter 180 is incorporated into an integrated circuit (IC) having a plurality of pins (e.g., a 16 pin or 20 pin arrangement). As shown in FIG. 1B, the pins may include an integrated current sense access pin 146 for access to the integrated current sense signal, a frequency-controlled voltage signal access pin 148 for access to the frequency-controlled voltage signal (VFC-TRL), a first gate access pin 107 for access to the gate of a first power switch 106, a second gate access pin 109 for access to the gate of a second power switch 108. In some examples, the IC having the resonant converter 180 may include other pins such as a ground pin, a power supply pin, line voltage sensing, voltage switching node pin, etc. In some examples, the resonant converter 180 may have other components and circuits such as a resonant capacitor stabilizer as disclosed in U.S. patent application Ser. No. 15/668,974, filed on Aug. 4, 2017, integrated current sense short protection as disclosed in U.S. patent application Ser. No. 15/668,980, filed on Aug. 4, 2017, and/or advanced burst mode control with power estimation as disclosed in U.S. patent application Ser. No. 15/668,983, filed on Aug. 4, 2017, each of which is incorporated by reference in its entirety.

The resonant converter 180 may include an input capacitance circuit 103, a bridge circuit 104, the resonant network 105, a transformer 116, a rectification circuit 124, and an output capacitance circuit 125. Also, the resonant converter 180 may include a feedback circuit 144, an isolation circuit 142, and a voltage controlled oscillator 150 (controlled by a frequency-controlled signal ($V_{FCTRL}$)), as well as the first driver 152, and the second driver 154.

The input capacitance circuit 103 may receive an input voltage ($V_{in}$). The input capacitance circuit 103 may include an input capacitor ($C_{in}$) 102 and a ground 113. In some examples, the input capacitor 102 may be a polarized capacitor having a negative terminal and a positive terminal. The negative terminal of the input capacitor 102 may be coupled to the ground 113. In some examples, the input capacitance circuit 103 may be considered a circuit separate from the bridge circuit 104. In some examples, the input capacitance circuit 103 may be considered as part of the bridge circuit 104.

As shown in FIG. 1B, the bridge circuit 104 may be a half-bridge circuit. For example, the bridge circuit 104 may include a pair of power switches including a first power switch 106 and a second power switch 108. In some examples, the first power switch 106 and the second power switch 108 are Metal Oxide Semiconductor Field Effect Transistors (MOSFET) power switches. In some examples, the bridge circuit 104 is a full-bridge circuit having two or more pairs of MOSFET switches.

Figure 2:
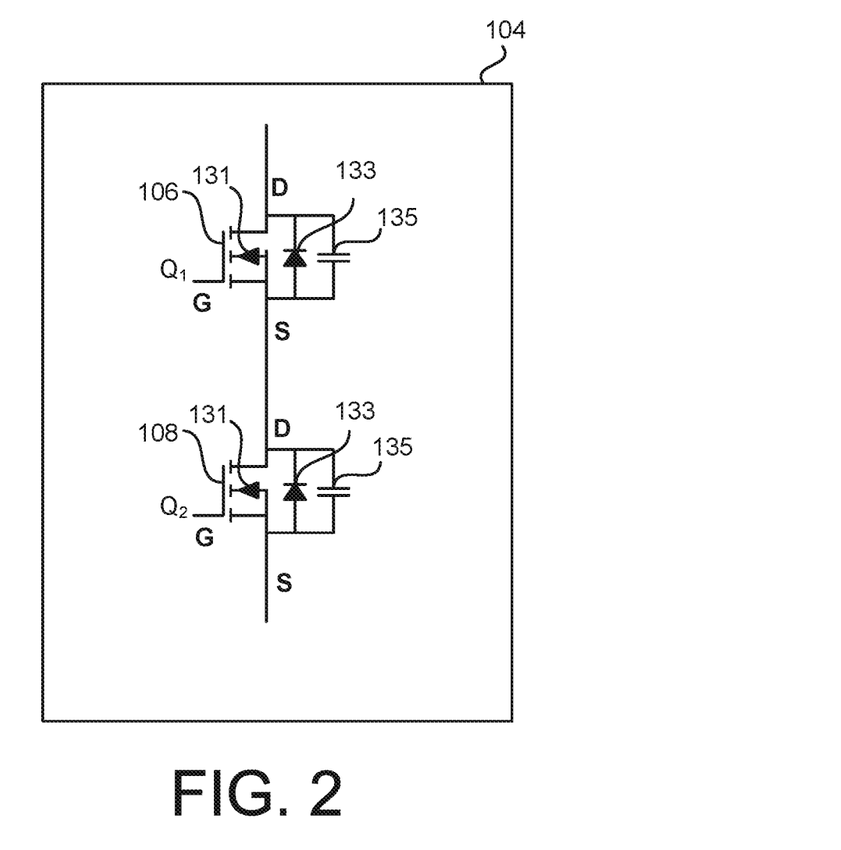
FIG. 2 illustrates an example of a bridge circuit of the resonant converter according to an implementation.

FIG. 2 illustrates an example of the bridge circuit 104 having the first power switch 106 and the second power switch 108 according to an implementation. In some examples, the first power switch 106 and the second power switch 108 may be an N-type MOSFETs. As shown in FIG. 2, each of the first power switch 106 and the second power switch 108 includes a gate (G), a source (S), and a drain (D). Also, each of the first power switch 106 and the second power switch 108 includes an intrinsic body diode 131, an anti-diode 133, and a parasitic output capacitor 135.

Referring back to FIG. 1B, the bridge circuit 104 may generate a square wave voltage by alternatively driving the first power switch 106 and the second power switch 108. In some examples, the bridge circuit 104 is alternatively driven with a 50% duty cycle for each switch. Based on the voltage-controlled signal ($V_{FCTRL}$), the voltage controlled oscillator 150 generates the first clock signal to control the first driver 152, and the second clock signal to control the second driver 154. The first driver 152 is connected to the gate of the first power switch 106, and the second driver 154 is connected to the gate of the second power switch 108.

During normal switching operations, the first driver 152 and the second driver 154 may switch the first power switch 106 and the second power switch 108, respectively, on and off in phase opposition symmetrically, that is, for exactly the same time (or around the same time). This can be referred to as 50% duty cycle operation even if the conduction time of either power switch 106, 108 is slightly shorter than 50% of the switching period. In other words, the first power switch 106 and the second power switch 108 may operate under the condition of equal pulse width (or substantial equal pulse width). In some examples, a dead time (e.g., a small dead time) is inserted between the turn-off of either power switch 106, 108 and the turn-on of the complementary one. This may ensure that the first power switch 106 and the second power switch 108 will not cross-conduct (or substantially not cross-conduct).

Based on the switching of the first power switch 106 and the second power switch 108, the bridge circuit 104 generates a square waveform, which excites the resonant network 105. The resonant network 105 filters the higher harmonic currents of the square waveform generated by the bridge circuit 104. Essentially, only sinusoidal current is allowed to flow through the resonant network 105 even though a square wave voltage is applied to the resonant network 105. As such, the resonant network 105 generates and outputs a resonant sinusoidal waveform that is scaled by the transformer 116 and rectified by the rectification circuit 124, and the output capacitance circuit 125 filters the rectified current and outputs a DC output voltage ($V_o$). The output voltage ($V_o$) may be adjusted by changing the operational frequency of the first power switch 106 and the second power switch 108.

In some examples, the resonant network 105 includes at least three reactive elements. In some examples, the resonant converter 180 is an LLC resonant converter. For example, the resonant network 105 may include a resonant capacitor ($C_r$) 110, a resonant inductor ($L_r$) 112, and a magnetizing inductor ($L_m$) 114. The magnetizing inductor 114 is configured to operate as a shunt inductor. The current lags the voltage applied to the resonant network 105, which allows the first power switch 106 and the second power switch 108 to be turned on with zero voltage. The transformer 116 includes a primary side winding 120 and one or more secondary side windings such as a first secondary side winding 118 and a second secondary side winding 122. The first secondary side winding 118 and the second secondary side winding 122 are coupled in series. In some examples, the secondary side winding includes only one winding (e.g., either first secondary side winding 118 or second secondary side winding 122). In some examples, the transformer 116 includes multiple windings on the primary side and multiple windings on the secondary side.

The rectification circuit 124 may produce a DC voltage by rectifying AC current. For example, the rectification circuit 124 may rectify the AC current with rectifier diodes such as a first rectification diode 130, and a second rectification diode 132. In some examples, the rectification circuit 124 includes only one rectification diode (e.g., either the first rectification diode 130 or the second rectification diode 132). In some examples, the rectification circuit 124 includes more than two rectification diodes. The anode of the first rectification diode 130 is connected to the positive terminal of the first secondary side winding 118, and the anode of the second rectification diode 132 is connected to the negative terminal of the second secondary side winding 122.

The output capacitance circuit 125 may filter the rectified current and output the DC output voltage ($V_o$). The output capacitance circuit 125 may include an output capacitor ($C_o$) 126, and an output resistor ($R_o$) 128. In some examples, the output capacitor 126 is connected in parallel to the output resistor 128. In some examples, the output capacitance circuit 125 may be considered a circuit separate from the rectification circuit 124. In some examples, the output capacitance circuit 125 may be considered as part of the rectification circuit 124.

The first rectification diode 130 and the second rectification diode 132 are connected to the output capacitor 126. For example, the cathode of the first rectification diode 130 is connected to the positive terminal of the output capacitor 126, and the cathode of the second rectification diode 132 is also connected to the positive terminal of the output capacitor 126. The negative terminal of the output capacitor 126 is connected to a ground 134.

The feedback circuit 144 may be configured to regulate the switching frequency of the resonant converter 180 with a voltage feedback loop by sensing the output voltage. The feedback circuit 144 may be connected to the output capacitance circuit 125 and/or the rectification circuit 124. The isolation circuit 142 is provided on the voltage feedback loop in order to provide isolation required by safety regulations. The isolation circuit 142 may receive a signal from the feedback circuit 144, and then generate the frequency-controlled voltage signal $V_{FCTRL}$ which is supplied to the oscillator 150.

Figure 3:
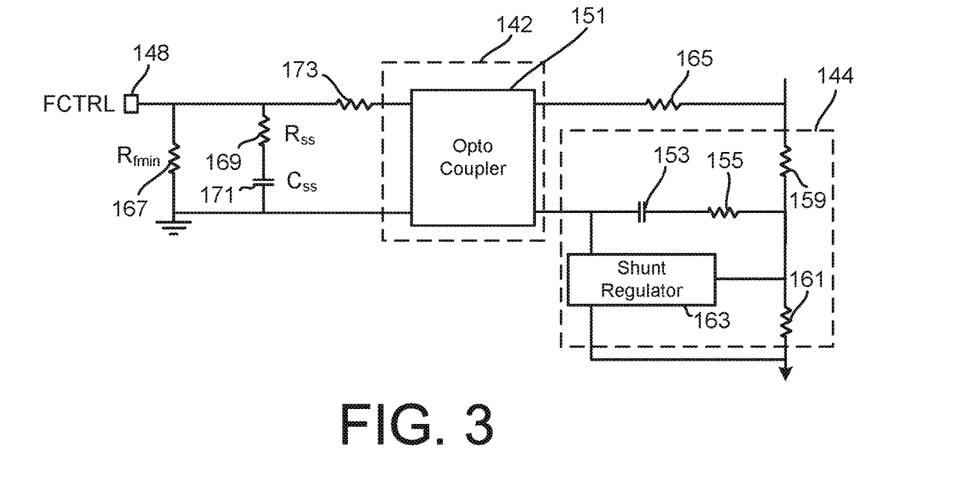
FIG. 3 illustrates an example of a feedback circuit and an isolation circuit of the resonant converter according to an implementation.

FIG. 3 illustrates an example of the feedback circuit 144 and the isolation circuit 142 according to an implementation. In some examples, the feedback circuit 144 may include a shunt regulator 163. In some examples, the feedback circuit 144 may also include one or more compensation resistors and one or more compensation capacitors. For example, the feedback circuit 144 may include a capacitor 153, a resistor 155, a resistor 159, and a resistor 161. The isolation circuit 142 may include an opto-coupler 151. The opto-coupler 151 may be coupled to the feedback circuit 144 and the voltage-controlled signal access pin 148. Also, in some examples, the resonant converter 180 may include a resistor ($R_{fmin}$) 167, a resistor ($R_{ss}$) 169, a capacitor ($C_{ss}$) 171, a resistor 173, and a resister 165. The resistor 167 may be coupled to the voltage-controlled signal access pin 148, and the resistor 167 may be in parallel with the resistor 169 and the capacitor 171. The resistor 173 may be disposed between the opto-coupler 151 and the voltage-controlled signal access pin 148.

Referring back to FIG. 1B, the current $I_{PRI}$ (through the resonant inductor 112) lags the voltage applied to the resonant network 105, which allows the first power switch 106 and the second power switch 108 to be turned on with zero voltage. Referring to FIGS. 1B and 2, the first power switch 106 turns on while the voltage across the first power switch 106 is zero (or close to zero) by flowing current through the anti-diode 133 of the first power switch 106. The parasitic output capacitor 135 of the first power switch 106 is discharged before the first power switch 106 is turned on. Similarly, the second power switch 108 turns on while the voltage across the second power switch 108 is zero (or close to zero) by flowing current through the anti-diode 133 of second power switch 108. The parasitic output capacitor 135 of the second power switch 108 is discharged before the second power switch 108 is turned on.

According to the embodiments, during the start-up of the above-described switching operations, the resonant capacitor stabilizer 101 is configured to stabilize the resonant capacitor 110 before the soft start circuit 188 is triggered. For example, the resonant capacitor stabilizer 101 may control the second driver 154 to periodically activate, over time, the second power switch 108 to discharge the resonant capacitor 110 during initialization of the switching operations of the resonant converter 180 such that the resonant capacitor 110 is periodically discharged at each activation instance until the resonant capacitor 110 is completely (or substantially discharged).

The resonant capacitor stabilizer 101 may include a timer 181, a voltage comparator 182, a latch 184, and an on-time counter 186. The latch 184 includes a set terminal (S), a reset terminal (R), and an output terminal (Q). The output terminal of the latch 184 may be connected to the second driver 154. The timer 181 may be connected to the set terminal (S) of the latch 184. The voltage comparator 182 may include a positive input terminal configured to receive a reference voltage (e.g., the voltage threshold) and a negative terminal configured to receive the voltage of the integrated current sense signal sensed by the integrated current sense circuit 140. The integrated current sense circuit 140 is connected to the resonant capacitor 110, and configured to sense the integrated current on the primary side of the transformer 116.

Figure 4:
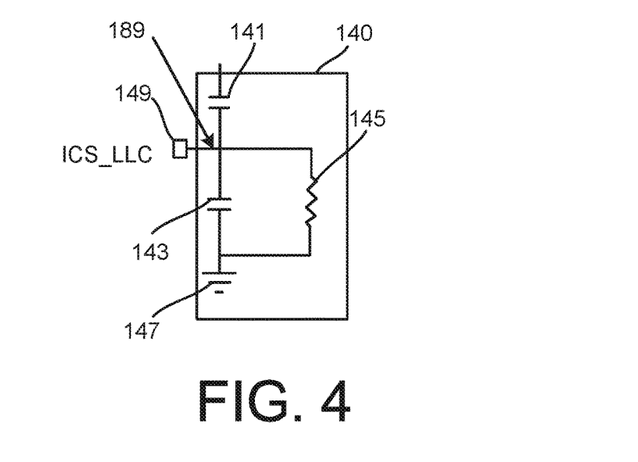
FIG. 4 illustrates an example of an integrated current sense circuit of the resonant converter according to an implementation.

FIG. 4 illustrates an example of the integrated current sense circuit 140 according to an implementation. The integrated current sense signal may be the integrated current of the primary side of the transformer 116. In some examples, the integrated current sense circuit 140 senses the integrated current sense signal by the capacitor divider 189 from the voltage of the resonance capacitor 110. The integrated current sense circuit 140 may include a first capacitor 141 and a second capacitor 143. The first capacitor 141 and the second capacitor 143 are configured as the capacitor divider 189 from the voltage of the resonance capacitor 110. The first capacitor 141 may be in series with the second capacitor 143. The integrated current sense circuit 140 may include a resistor 145 in parallel with the second capacitor 143. In some examples, the resonant converter 100 may include an integrated current access pin 149 coupled to a point between the first capacitor 141 and the second capacitor, which may receive the integrated current sense signal. The voltage ($V_{ICS}$) of the integrated current sense signal may have a relation with the current ($I_{PRI}$) flowing through the resonance inductor 112. For example, $V_{ICS}$=k*(integral ($I_{PRI}$))–bias voltage. The ratio of the first capacitor 141 and the second capacitor 143 may determine the constant k, and the resistor 145 may remove the voltage offset (or voltage bias) of the voltage of the capacitor divider 189.

Referring back to FIG. 1B, the output terminal of the voltage comparator 182 may be connected to the reset terminal (R) of the latch 184. The on-time counter 186 may be connected to the output terminal (Q) of the latch 184, and the on-time counter 186 may be connected to the timer 181.

Upon start of the initialization of the switching operations of the resonant converter 180 (e.g., after the switching operations were disrupted such as power-off or the invoking of the isolation circuit 142 or other protection mechanisms), the timer 181 is configured to activate the second power switch 108 (by triggering a high state of the capacitor stabilization signal) in order to discharge the resonant capacitor 110. The timer 181 is configured to activate the set terminal (S) of the latch 184 such that the output terminal (Q) of the latch 184 generates and sends the high state of the capacitor stabilization signal to the second driver 154 to turn-on the second power switch 108 to discharge the resonant capacitor 110. In other words, when the timer 181 is a logic high, the set terminal (S) of the latch 184 transitions to a logic high causing the output (Q) of the latch 184 to transition to a logic high (thereby providing the high state of the capacitor stabilization signal 502), which instructs the second driver 154 to turn-on the second power switch 108.

The resonant capacitor stabilizer 101 activates the second power switch 108 until the voltage of the integrated current sense signal is equal to or below the voltage threshold. For example, the voltage comparator 182 may compare the voltage of the integrated current sense signal to the reference voltage ($V_1$), and, in response to the reference voltage being larger than the voltage of the integrated current sense signal, the voltage comparator 182 may reset the latch 184 causing the second power switch 108 to de-activate.

After a predetermined time duration expires after the deactivation of the second power switch 108, the timer 181 may re-activate the second power switch 108 (by triggering a high state of the capacitor stabilization signal) in order to re-discharge the resonant capacitor 110 until the voltage of the integrated current sense signal is equal to or below the voltage threshold. The resonant capacitor stabilizer 101 may continue to re-activate and deactivate the second power switch 108 during the capacitor stabilization period. In some examples, the timer 181 may turn-on the second power switch 108 every X micro-seconds, where X may include any value between, for example, 9-15 micro-seconds. In some examples, the timer 181 may turn-on the second power switch 108 every 12.78 micro-seconds. In some examples, the length of time between power switch activations in which the second power switch 108 is deactivated is the same throughout the capacitor stabilization period. In some examples, the length of time between one or more power switch activations is different from another power switch activation during the capacitor stabilization period. For example, a second activation may occur X micro-seconds after a first activation, and a third activation may occur Y micro-seconds after the second activation, where X and Y are different.

The on-time counter 186 may count an activation time of the second power switch 108 (e.g., how long the second power switch 108 has been turned-on or activated within a particular activation instance). The on-time counter 186 may compare the activation time to a threshold, and, in response to the activation time being greater than the threshold level, the on-time counter 186 may send a stabilization end signal (indicating end of the capacitor stabilization period) to the timer 181.

For example, when the high state of the capacitor stabilization signal is equal to or above the threshold, the on-time counter 186 may generate and send the stabilization end signal to the timer 181. In this situation, the resonant capacitor 110 may be considered discharged (e.g., at or around 0V), and the high-side switch (e.g., the first power switch 106) may be ready to operate. Upon receipt of the stabilization end signal, the timer 181 may be disabled. Also, at or around the time of the sending of the stabilization end signal, the on-time counter 186 may send a signal to the soft start circuit 188 to perform soft start operations of the resonant converter 180. As further shown in FIGS. 7 and 8, the soft start circuit 188 may gradually increase, over time, a duty cycle, and gradually decrease, over time, a switching frequency of the first and second clock signals generated by the oscillator 150.

Figure 5:
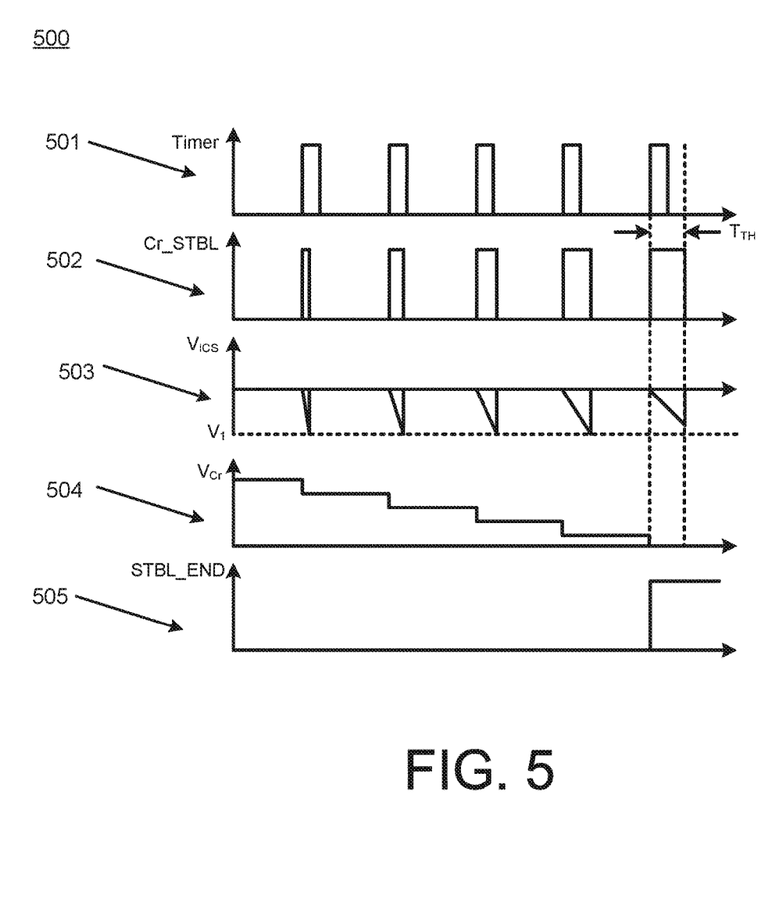
FIG. 5 illustrates a timing diagram of signals of a resonant capacitor stabilizer of the resonant converter according to an implementation.

FIG. 5 illustrates a timing diagram 500 of the signals of the resonant capacitor stabilizer 101 according to an implementation. The timing diagram 500 shows a signal waveform 501 generated by the timer 181, the capacitor stabilization signal 502 sent to the second driver 154 that depicts the actuation duration of the second power switch 108, the voltage ($V_{ICS}$) 503 of the integrated current sense signal, the voltage ($V_{CR}$) 504 of the resonant capacitor 110, and the stabilization end signal 505 generated by on-time counter 186.

The leading edge of each pulse of the timer's signal waveform 501 starts a pulse of the capacitor stabilization signal 502. For example, when the timer 181 transitions to a logic high, the set terminal (S) of the latch 184 transitions to a logic high causing the output (Q) to transition to a logic high (thereby providing the capacitor stabilization signal 502), which instructs the second driver 154 to turn-on the second power switch 108. A pulse width of the high state of the capacitor stabilization signal 502 indicates how long the second power driver 108 is activated to discharge the resonant capacitor 110 during a particular activation instance. When the voltage ($V_{ICS}$) 503 of the integrated current sense signal is less than the threshold voltage ($V_1$), the output of the comparator 182 is a logic high to reset the latch 184 to turn-off the second power switch 108 (thereby defining the end of the high state of a particular pulse of the capacitor stabilization signal 502). As the resonant capacitor stabilizer 101 periodically activates the second power switch 108, the voltage ($V_{CR}$) 504 of the resonant capacitor 110 is discharged (e.g., each activation causes the voltage ($V_{CR}$) 504 to decrease a certain amount until the resonant capacitor 110 is fully (or substantially) discharged. When the high period of the capacitor stabilization signal 502 is equal to or greater than the threshold ($T_{TH}$), the on-time counter 186 transitions to a logic high (thereby providing the stabilization end signal), which disables the timer 181. As shown in FIG. 5, the high period of the capacitor stabilization signal 502 gradually becomes longer until reaching the threshold ($T_{TH}$) causing the end of the capacitor stabilization period in which the resonant capacitor 110 is fully discharged.

Figure 6:
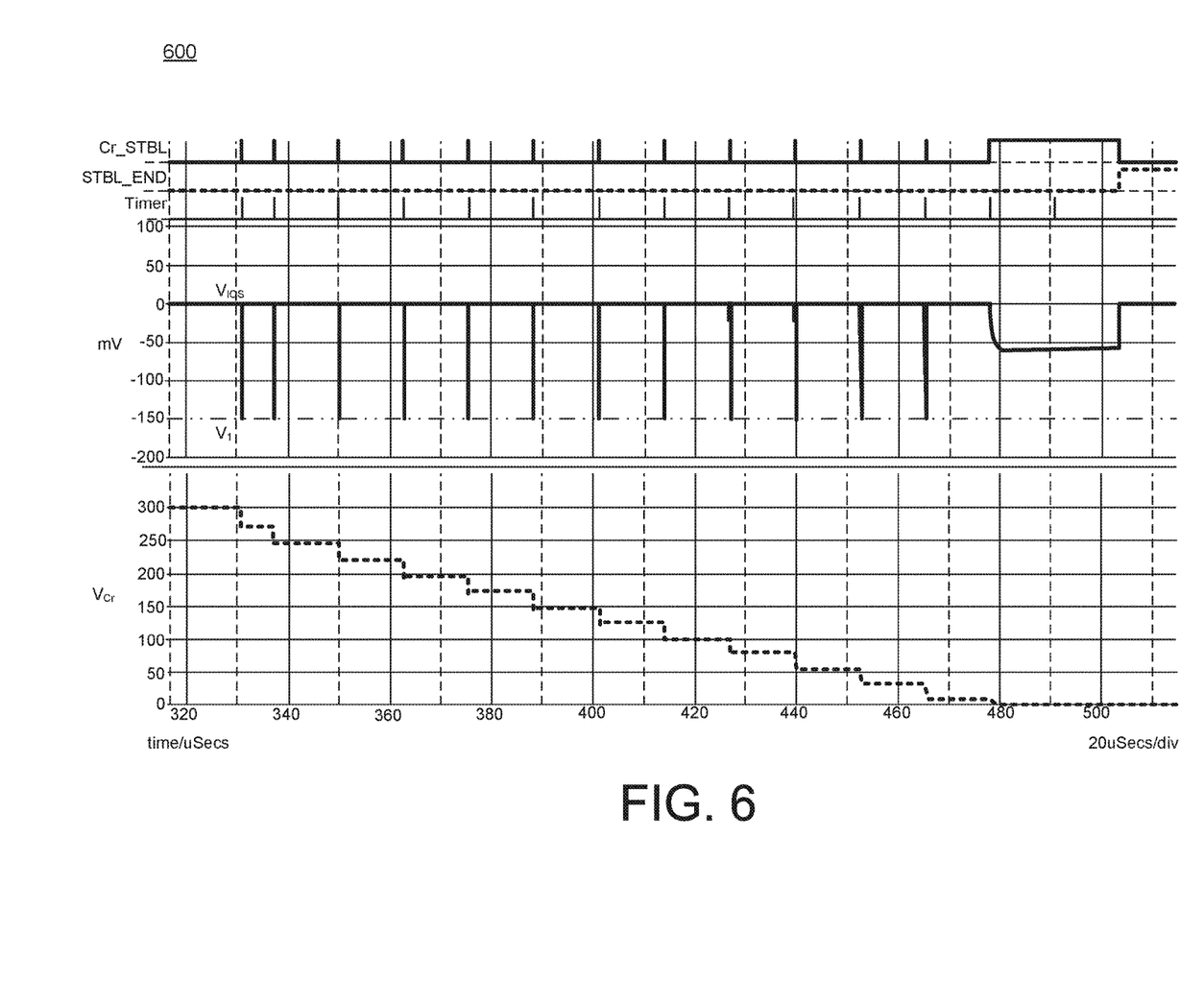
FIG. 6 illustrates example simulation results of the resonant capacitor stabilizer according to an implementation.

FIG. 6 illustrates example simulation results 600 of the resonant capacitor stabilizer 101 according to an implementation. The simulation results 600 depict the various signals of FIG. 5 under a simulation scenario. As shown in FIG. 6, as the resonant capacitor stabilizer 101 periodically activates the second power switch 108 in the manner previously described, the voltage ($V_{CR}$) of the resonant capacitor 110 is gradually discharged during the capacitor stabilization period.

Figure 7:
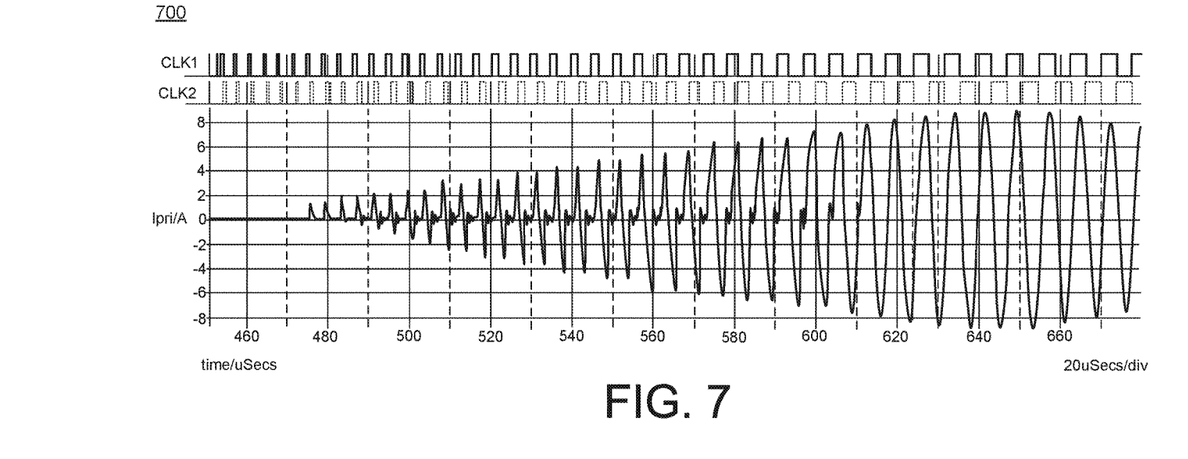
FIG. 7 illustrates example simulation results of soft start operations with capacitor stabilization by the resonant capacitor stabilizer according to an implementation.

FIG. 7 illustrates example simulation results 700 of soft start operations with capacitor stabilization by the resonant capacitor stabilizer 101 according to an implementation. As shown in FIG. 7, the soft start circuit 162 causes the oscillator 150 to generate alternating first and second clock signals. Over time, the soft start circuit 162 increases the duty cycle and decreases the frequency of the first and second clock signals. During the course of the soft start operations (as the duty cycle increases and the frequency decreases), the amount of current ($I_{PRI}$) on the primary side of the transformer 116 increases.

Figure 8:
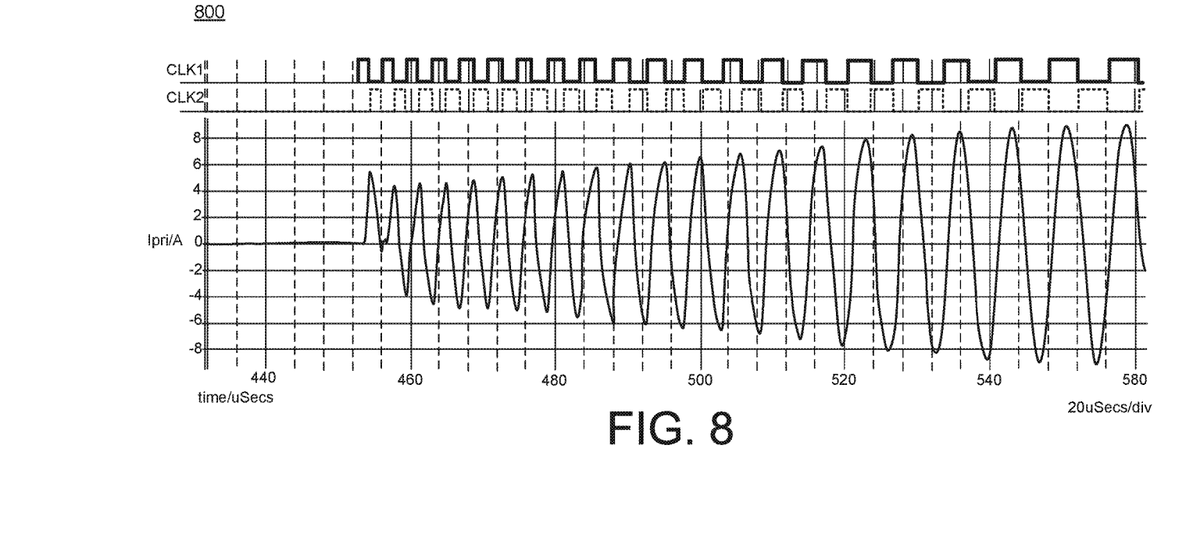
FIG. 8 illustrates example simulation results of soft start operations without using capacitor stabilization by the resonant capacitor stabilizer according to an implementation.

FIG. 8 illustrates example simulation results 800 of soft start operations without using capacitor stabilization by the resonant capacitor stabilizer 101 according to an implementation. As shown FIG. 8, during the course of the soft start operations (as the duty cycle increases and the frequency decreases), the amount of current ($I_{PRI}$) on the primary side of the transformer 116 increases. However, comparing the simulation results 700 and the simulation results 800, the operations of the resonant capacitor stabilizer 101 before the soft start operations reduces the amount of current spikes ($I_{PRI}$) on the primary side of the transformer 116. Instead, the current ($I_{PRI}$) is gradually increased, thereby reducing the effects of having large current spikes in the second power switch 108.

According to an implementation, a resonant converter for resonant capacitance stabilization during start-up includes an oscillator configured to generate a first clock signal to drive a first driver for a first power switch, and a second clock signal to drive a second driver for a second power switch during switching operations, and a resonant capacitor stabilizer configured to control the second driver to periodically activate the second power switch to discharge a resonant capacitor of a resonant network during initialization of the switching operations of the resonant converter.

In some implementations, the resonant converter may include one or more of the following features (or any combination thereof). The resonant capacitor stabilizer may be configured to activate the second power switch for a first duration and activate the second power switch for a second duration such that the second power switch is deactivated during a period of time between the first duration and the second duration. The second duration may be longer than the first duration. After the second power switch is activated during an activation instance, the resonant capacitor stabilizer may be configured to deactivate the second power switch in response to a voltage of an integrated current sense signal being equal to or below a voltage threshold. The resonant converter may include an integrated current sense circuit connected to the resonant capacitor, and the integrated current sense circuit may be configured to sense the integrated current sense signal on a primary side of a transformer of the resonant network. The resonant capacitor stabilizer may be configured to receive the voltage of the integrated current sense signal, and compare the voltage of the integrated current sense signal to the voltage threshold. The resonant capacitor stabilizer may be configured to trigger a soft start circuit to start soft start operations in response to the second power switch being activated longer than a threshold. The resonant capacitor stabilizer may include a latch having a set terminal, a reset terminal, and an output terminal, where the output terminal of the latch may be connected to the second driver. The resonant capacitor stabilizer may include a timer connected to the set terminal of the latch, and a voltage comparator having a first input terminal connected to a voltage of an integrated current sense signal, a second input terminal connected to a reference voltage, and an output terminal connected to the reset terminal of the latch. The resonant capacitor stabilizer may include an on-time counter connected to the timer and the output terminal of the latch. The timer may be configured to periodically activate the set terminal of the latch such that the output terminal of the latch periodically sends a high state of a capacitor stabilization signal to the second driver to turn-on the second power switch to discharge the resonant capacitor. The on-time counter may be configured to count an activation time of the second power switch, and, in response to the activation time exceeding a threshold, the on-time counter is configured to send a stabilization end signal to the timer to end the discharging of the resonant capacitor. The voltage comparator may be configured to compare the voltage of the integrated current sense signal and the reference voltage, and, in response to the reference voltage being larger than the voltage of the integrated current sense signal, the voltage comparator is configured to reset the latch causing the second power switch to deactivate.

According to an implementation, a resonant converter for resonant capacitance stabilization during start-up includes an oscillator configured to generate a first clock signal to drive a first driver for a first power switch, and a second clock signal to drive a second driver for a second power switch during switching operations, and a resonant capacitor stabilizer configured to control the second driver to activate the second power switch to discharge a resonant capacitor of a resonant network during a capacitor stabilization period that occurs during initialization of the switching operations of the resonant converter. The resonant capacitor stabilizer is configured to control the second driver to deactivate the second power switch in response to a voltage of an integrated current sense signal being equal to or less than a threshold voltage.

In some implementations, the resonant converter may include one of more of the above/below features (or any combination thereof). The resonant capacitor stabilizer may be configured to control the second driver to activate and deactivate multiple times during the capacitor stabilization period. The resonant capacitor stabilizer is configured to activate the second power switch at a first time and then deactivate the second power switch when the voltage of the integrated current sense signal is equal to or less than the threshold voltage such that the second power switch is activated for a first duration. The resonant capacitor stabilizer may be configured to activate the second power switch at a second time and then deactivate the second power switch when the voltage of the integrated current sense signal is equal to or less than the threshold voltage such that the second power switch is activated for a second duration. The second duration may be longer than the first duration. The resonant capacitor stabilizer may be configured to receive the integrated current sense signal sensed on a primary side of a transformer of the resonant network. The resonant converter may include an integrated current sense circuit connected to the resonant capacitor, where the integrated current sense circuit is configured to sense the integrated current sense signal on the primary side of the transformer of the resonant network, and the integrated current sense circuit includes a capacitor divider. The resonant capacitor stabilizer may be configured to trigger a soft start circuit to start soft start operations in response to an activation period of the second power switch being longer than a threshold.

According to an implementation, a resonant converter for resonant capacitance stabilization during start-up includes an oscillator configured to generate a first clock signal to drive a first driver for a first power switch, and a second clock signal to drive a second driver for a second power switch during switching operations, and a resonant capacitor stabilizer configured to control the second driver to activate the second power switch to discharge a resonant capacitor of a resonant network during initialization of the switching operations of the resonant converter. The resonant capacitor stabilizer includes a timer configured to periodically activate the second power switch, and an on-time counter is configured to count an activation time of the second power switch. The resonant capacitor stabilizer is configured to trigger a soft start circuit to start soft start operations in response to the activation time of the second power switch exceeding a threshold.

In some implementations, the resonant converter may include one of more of the above/below features (or any combination thereof). The resonant capacitor stabilizer may be configured to deactivate the second power switch at each activation instance in response to a voltage of an integrated current sense signal being equal to or below a voltage threshold. The second power switch may be a low-side metal oxide semiconductor field effect transistor (MOSFET).

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A resonant converter for resonant capacitance stabilization during start-up, the resonant converter comprising:
   an oscillator configured to generate a first clock signal to drive a first driver for a first power switch, and a second clock signal to drive a second driver for a second power switch during switching operations; and a resonant capacitor stabilizer configured to control the second driver to periodically activate the second power switch to discharge a resonant capacitor of a resonant network during initialization of the switching operations of the resonant converter, the resonant capacitor stabilizer configured to activate the second power switch for a first duration and activate the second power switch for a second duration such that the second power switch is deactivated during a period of time between the first duration and the second duration.

2. The resonant converter of claim 1, wherein the second duration is longer than the first duration.

3. The resonant converter of claim 1, wherein, after the second power switch is activated during an activation instance, the resonant capacitor stabilizer is configured to deactivate the second power switch in response to a voltage of an integrated current sense signal being equal to or below a voltage threshold.

4. The resonant converter of claim 3, further including:
an integrated current sense circuit connected to the resonant capacitor, the integrated current sense circuit configured to sense the integrated current sense signal on a primary side of a transformer of the resonant network, the resonant capacitor stabilizer being configured to receive the voltage of the integrated current sense signal, and compare the voltage of the integrated current sense signal to the voltage threshold.

5. The resonant converter of claim 1, wherein the resonant capacitor stabilizer is configured to trigger a soft start circuit to start soft start operations in response to the second power switch being activated longer than a threshold.

6. The resonant converter of claim 1, wherein the resonant capacitor stabilizer includes:
a latch having a set terminal, a reset terminal, and an output terminal, the output terminal of the latch being connected to the second driver;
a timer connected to the set terminal of the latch;
a voltage comparator having a first input terminal connected to a voltage of an integrated current sense signal, a second input terminal connected to a reference voltage,
and an output terminal connected to the reset terminal of the latch; and
an on-time counter connected to the timer and the output terminal of the latch.

7. The resonant converter of claim 6, wherein the timer is configured to periodically activate the set terminal of the latch such that the output terminal of the latch periodically sends a high state of a capacitor stabilization signal to the second driver to turn-on the second power switch to discharge the resonant capacitor.

8. The resonant converter of claim 6, wherein the on-time counter is configured to count an activation time of the second power switch, and, in response to the activation time exceeding a threshold, the on-time counter is configured to send a stabilization end signal to the timer to end the discharging of the resonant capacitor.

9. The resonant converter of claim 6, wherein the voltage comparator is configured to compare the voltage of the integrated current sense signal and the reference voltage, and, in response to the reference voltage being larger than the voltage of the integrated current sense signal, the voltage comparator is configured to reset the latch causing the second power switch to deactivate.

10. A resonant converter for resonant capacitance stabilization during start-up, the resonant converter comprising:

an oscillator configured to generate a first clock signal to drive a first driver for a first power switch, and a second clock signal to drive a second driver for a second power switch during switching operations; and a resonant capacitor stabilizer configured to control the second driver to activate the second power switch to discharge a resonant capacitor of a resonant network during a capacitor stabilization period that occurs during initialization of the switching operations of the resonant converter, the resonant capacitor stabilizer configured to control the second driver to deactivate the second power switch in response to a voltage of an integrated current sense signal being equal to or less than a threshold voltage.

11. The resonant converter of claim 10, wherein the resonant capacitor stabilizer is configured to control the second driver to activate and deactivate multiple times during the capacitor stabilization period.

12. The resonant converter of claim 10, wherein the resonant capacitor stabilizer is configured to activate the second power switch at a first time and then deactivate the second power switch when the voltage of the integrated current sense signal is equal to or less than the threshold voltage such that the second power switch is activated for a first duration, wherein the resonant capacitor stabilizer is configured to activate the second power switch at a second time and then deactivate the second power switch when the voltage of the integrated current sense signal is equal to or less than the threshold voltage such that the second power switch is activated for a second duration.

13. The resonant converter of claim 12, wherein the second duration is longer than the first duration.

14. The resonant converter of claim 10, wherein the resonant capacitor stabilizer is configured to receive the integrated current sense signal sensed on a primary side of a transformer of the resonant network.

15. The resonant converter of claim 14, further comprising:
an integrated current sense circuit connected to the resonant capacitor, the integrated current sense circuit configured to sense the integrated current sense signal on the primary side of the transformer of the resonant network, the integrated current sense circuit including a capacitor divider.

16. The resonant converter of claim 10, wherein the resonant capacitor stabilizer is configured to trigger a soft start circuit to start soft start operations in response to an activation period of the second power switch being longer than a threshold.

17. A resonant converter for resonant capacitance stabilization during start-up, the resonant converter comprising:
an oscillator configured to generate a first clock signal to drive a first driver for a first power switch, and a second clock signal to drive a second driver for a second power switch during switching operations; and
a resonant capacitor stabilizer configured to control the second driver to activate the second power switch to discharge a resonant capacitor of a resonant network during initialization of the switching operations of the resonant converter, the resonant capacitor stabilizer including:
a timer configured to periodically activate the second power switch; and
an on-time counter is configured to count an activation time of the second power switch, the resonant capacitor stabilizer configured to trigger a soft start circuit to start soft start operations in response to the activation time of the second power switch exceeding a threshold.

18. The resonant converter of claim 17, wherein the resonant capacitor stabilizer is configured to deactivate the second power switch at each activation instance in response to a voltage of an integrated current sense signal being equal to or below a voltage threshold.

19. The resonant converter of claim 17, wherein the second power switch is a low-side metal oxide semiconductor field effect transistor (MOSFET).

* * * * *